US008813382B1

(12) United States Patent
Buttrick

(10) Patent No.: US 8,813,382 B1
(45) Date of Patent: Aug. 26, 2014

(54) SHIM MEASUREMENT SYSTEM AND METHOD OF OPERATING THE SAME

(71) Applicant: The Boeing Company, Chicago, IL (US)

(72) Inventor: James N. Buttrick, Seattle, WA (US)

(73) Assignee: The Boeing Company, Chicago, IL (US)

( * ) Notice: Subject to any disclaimer, the term of this patent is extended or adjusted under 35 U.S.C. 154(b) by 144 days.

(21) Appl. No.: 13/657,134

(22) Filed: Oct. 22, 2012

(51) Int. Cl.
*G01B 7/31* (2006.01)
(52) U.S. Cl.
USPC ............................................. 33/613; 33/563
(58) Field of Classification Search
USPC ............. 33/613, 645, 563; 702/35, 81, 84, 97
See application file for complete search history.

(56) References Cited

U.S. PATENT DOCUMENTS

| 4,526,641 A | 7/1985 | Schriever et al. | |
| 4,649,752 A | 3/1987 | Turner | |
| 4,848,137 A | 7/1989 | Turner et al. | |
| 5,456,018 A * | 10/1995 | Irlbeck et al. | 33/645 |
| 5,797,193 A * | 8/1998 | Amend et al. | 33/645 |
| 6,073,358 A * | 6/2000 | Nguyen | 33/613 |
| 6,922,906 B2 * | 8/2005 | Choi et al. | 33/613 |
| 8,438,742 B2 * | 5/2013 | Strachan et al. | 33/1 H |
| 2002/0069545 A1 * | 6/2002 | Belliveau | 33/645 |
| 2002/0083610 A1 * | 7/2002 | Camara et al. | 33/645 |
| 2010/0154236 A1 * | 6/2010 | Hall | 33/645 |
| 2014/0090263 A1 * | 4/2014 | Barton | 33/645 |

* cited by examiner

*Primary Examiner* — G. Bradley Bennett
(74) *Attorney, Agent, or Firm* — The Small Patent Law Group; Dean D. Small

(57) ABSTRACT

A shim measurement system and a method of measuring shims are provided. One system includes a shim measuring device configured to be positioned between a first part and a second part, the shim measuring device including a template and a plurality of gap measurement sensors coupled to the template, each of the gap measurement sensors configured to measure a distance between the first and second parts, the shim measuring device configured to output a matrix of values that represent the plurality of measured distances, and a computer configured to receive the matrix of values and generate a shim model based on the matrix of values.

20 Claims, 4 Drawing Sheets

US 8,813,382 B1

SHIM MEASUREMENT SYSTEM AND METHOD OF OPERATING THE SAME

BACKGROUND

The present disclosure relates generally to a system and method of measuring shims, such as shims for an aircraft assembly.

Aircraft manufacturing involves the assembly of many parts that are required to fit together within predetermined tolerances. Accordingly, shims are often utilized at interfaces between various parts to fill the gap between the parts and to ensure that the various parts fit together properly, as well as to facilitate proper load distribution between the parts.

Shims utilized to assemble various aircraft parts vary in size and complexity. For example, there are some parts that have substantially planar surfaces. Accordingly, shims having a substantially planar surface, referred to herein as flat shims, may be utilized. Moreover, other parts utilized to form the aircraft have complex shapes and surfaces. Therefore, the shims utilized between two parts having complex shapes or surfaces also have complex shapes and surfaces.

At least one known method of fabricating a shim includes manually measuring the gap between the two parts where a shim is to be installed. For example, a technician may initially draw a sketch of a shim to be installed. The technician may then manually reposition a mechanical device, such as a feeler gauge, to obtain a plurality of measurements at different locations within the gap. The technician then manually draws the measurements on the sketch. The sketch may then be utilized to hand cut the shim based on the measurements obtained. However, manually measuring the gaps and then hand cutting shims is often time consuming. For example, a typical process thus includes, gap measurements that are initially manually obtained, the shim is then trimmed, and the trimmed shim then re-installed into the desired gap. The process of manually measuring the gap and then hand trimming the shim may require several iterations to produce a shim that is sized to fit within a particular gap. Moreover, if the gap has a complex surface, the amount of time required to measure, trim and then install the shim is further increased.

Other known methods of fabricating a shim include using an electronic device to measure the gap. More specifically, a technician may again initially draw a sketch of a shim to be installed. The technician may then manually position the electronic device at a first location to obtain a first measurement, reposition the electronic device to a second location to obtain a second measurement, etc. The shim is then manufactured in the same manner as described above with respect to the manual measuring device.

However, both the mechanical measuring device and the electronic measuring device are configured to obtain a single measurement at a single location within the gap. Thus, to fabricate the shim, the user must manually reposition the mechanical or electronic device at various different locations within the gap. Additionally, the user must manually identify the exact location within the gap being measured, using for example the sketch, to enable the shim to be fabricated. As a result, both the mechanical measuring device and the electronic measuring device rely on the technician to manually reposition the device at the various locations to perform the measurements. Moreover, both the manual and electronic measurement devices rely on the technician's ability to accurately identify a location that the measurement is being performed to enable a shim to be manufactured. Accordingly, measuring the gap between two parts to fabricate a shim using either the mechanical device or the electronic device is both time consuming and may not result in measurements having a required precision to fabricate the shim.

The mechanic may also manually transfer the measurement points to a computer-aided design (CAD) model which may then be used to automatically machine shims using a numerical control (NC) machine.

SUMMARY

In accordance with one embodiment, a shim measurement system is provided. The shim measurement system includes a shim measuring device including a template and a plurality of gap measurement sensors coupled to the template, each of the gap measurement sensors configured to measure a distance between the first and second parts, the shim measuring device configured to output a matrix of values that represent the plurality of measured distances, and a computer configured to receive the matrix of values and generate a shim model based on the matrix of values.

In accordance with another embodiment, a shim measuring device is provided that includes a flexible template configured to be positioned between a first part and a second part, and a plurality of gap measurement sensors coupled to the flexible template, each of the gap measurement sensors configured to measure a distance between the first and second parts, the shim measuring device configured to output a matrix of values that represent the plurality of measured distances.

In accordance with another embodiment, a method of fabricating a shim is provided. The method includes inserting a shim measurement device between a first part and a second part, the shim measuring device including a flexible template and a plurality of gap measurement sensors coupled to the flexible template, generating a plurality of gap measurements using the gap measurement sensors, and generating a three-dimensional (3D) model of a shim to be positioned between the first and second parts using the plurality of gap measurements.

The features, functions, and advantages that have been discussed can be achieved independently in various embodiments or may be combined in yet other embodiments, further details of which can be seen with reference to the following description and drawings.

DETAILED DESCRIPTION

Figure 1:
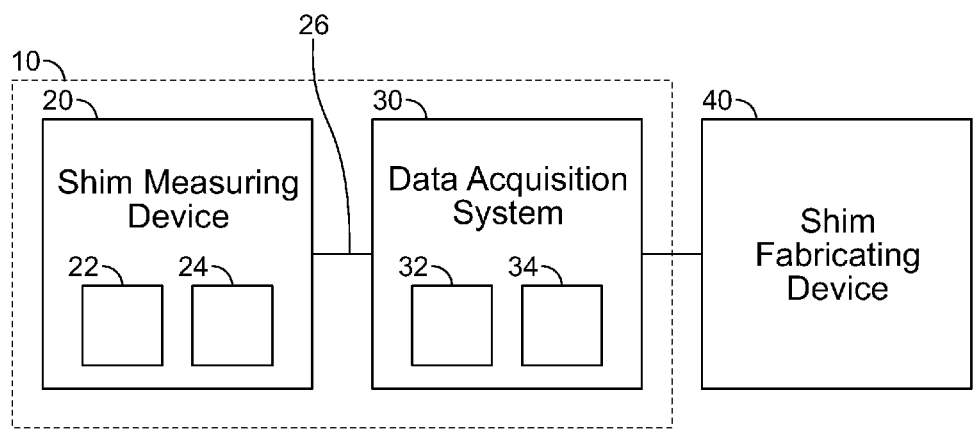
FIG. 1 is a block illustration of a shim measurement system in accordance with one embodiment.

The following detailed description of certain embodiments will be better understood when read in conjunction with the appended drawings. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Various embodiments described and/or illustrated herein provide a shim measurement system for automatically recording gaps at known locations and generating a model of a shim that may then be utilized to fabricate the shim. For example, one embodiment provides a shim measurement system that is operable to measure a gap between a pair of aircraft parts. The measurements may then be utilized to fabricate a shim that is configured to fit between the pair of aircraft parts. However, it should be appreciated that the various embodiments are not limited to aircraft applications, but the shim measurement system may be used in non-aircraft applications. For example, the various embodiments may be used in land, air, sea and space applications.

In various embodiments, a shim measurement system 10 may be provided as illustrated in FIG. 1. The shim measurement system 10, in one embodiment, includes a shim measuring device 20 and a data acquisition system (DAS) 30. In operation, the shim measuring device 20 includes a plurality of sensors (described below) to enable the shim measuring device 20 to acquire a plurality of measurements of a gap between two parts, substantially concurrently, and at different locations within the gap. The shim measuring device 20 is described in more detail below.

In various embodiments, the plurality of measurements generated by the shim measuring device 20 are stored in a file 22 within a memory 24 of the shim measuring device 20. Optionally, the plurality of measurements may be transmitted in real-time to the DAS 30 for subsequent processing via a communication link. The shim measuring device 20 may be hard-wired to the DAS 30 via a communication link 26. Optionally, the shim measuring device 20 may be configured to transmit the file 22 wirelessly to the DAS 30 and/or directly to a shim fabricating device 40. As used herein, a file, in various embodiments, means a set of electronic records or related electronic information that is stored in the same location.

In operation, the DAS 30 is configured to receive the gap measurement information, i.e. the file 22, from the shim measuring device 20. The DAS 30 is configured to output a matrix of measurements, e.g. a shim model 32, to the shim fabricating device 40. The shim model 32 may then be utilized by the shim fabricating device 40 to fabricate a shim to be utilized in the gap measured by the shim measuring device 20. The DAS 30 may be embodied as a portable computer such as a laptop computer or a hand-held computer that transmits information to, and receives information from the shim measuring device 20. Moreover, the DAS 30 may also transmit information to, and receive information from, the shim fabricating device 40.

The DAS 30 includes a central processing unit (CPU) or computer 34 to process the file 22 and generate the shim model 32. As used herein, the term "computer" may include any processor-based or microprocessor-based system including systems using microcontrollers, reduced instruction set computers (RISC), application specific integrated circuits (ASICs), field programmable gate array (FPGAs), logic circuits, and any other circuit or processor capable of executing the functions described herein. The above examples are exemplary only, and are thus not intended to limit in any way the definition and/or meaning of the term "computer". The shim fabricating device 40, in one embodiment, is a computer numeric controlled (CNC) manufacturing machine or any machine capable of machining or fabricating a shim to be utilized in the measured gap.

Figure 2:
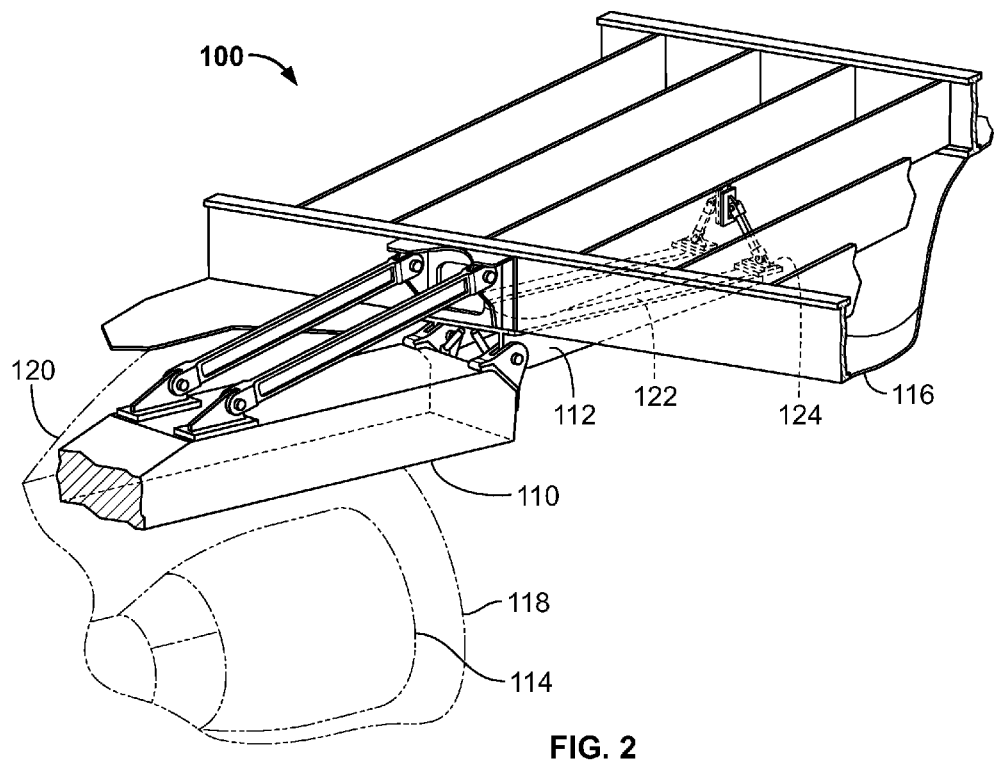
FIG. 2 is a partial cutaway isometric view of an aircraft wing assembly in accordance with one embodiment.

As described above, the shim measurement system 10 is configured to automatically generate a shim model 32 that may then be utilized to fabricate a shim to be utilized with, for example, an engine strut utilized to couple an engine to a wing assembly. FIG. 2 is a partial cutaway isometric view of an aircraft wing assembly 100 having gaps that may be measured using the shim measurement system 10 shown in FIG. 1.

In various embodiments, the aircraft wing assembly 100 includes an engine pylon or engine strut 110 (shown schematically) that is structurally coupled to a unitary engine strut support fitting 112. The engine strut 110 supports an engine 114, such as a turbofan engine, positioned below a wing 116 and housed in a nacelle 118. A fairing 120 extends between the nacelle 118 and the wing 116 and encloses the engine strut 110. In operation, the primary loads from the engine 114 are transferred to the wing 116 through the engine strut 110. Accordingly, in various embodiments, it is desirable to position a shim 122 between portions of the engine strut 110 and the wing 116 to ensure that the load is properly distributed from the engine strut 110 and the wing 116. It should be realized that although only a single shim 122 is illustrated, the aircraft wing assembly 100 may include a plurality of shims, and that the shim 122 is exemplary only. It should also be realized that although various embodiments are described with respect to fabricating a shim that may be utilized between the engine strut 110 and the wing 116, the shim measurement system 10 described herein may be utilized to fabricate shims for any desired parts, and that the engine strut 110 and the wing 116 are only examples.

Figure 3:
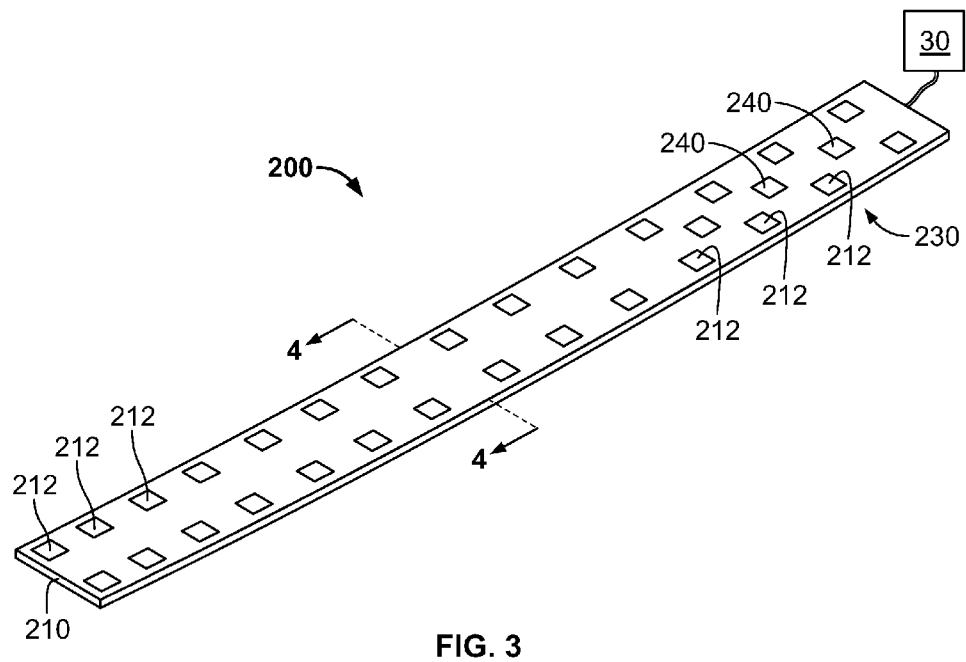
FIG. 3 is top perspective view of a shim measuring device that may be utilized with the shim measurement system shown in FIG. 1 in accordance with one embodiment.
Figure 4:
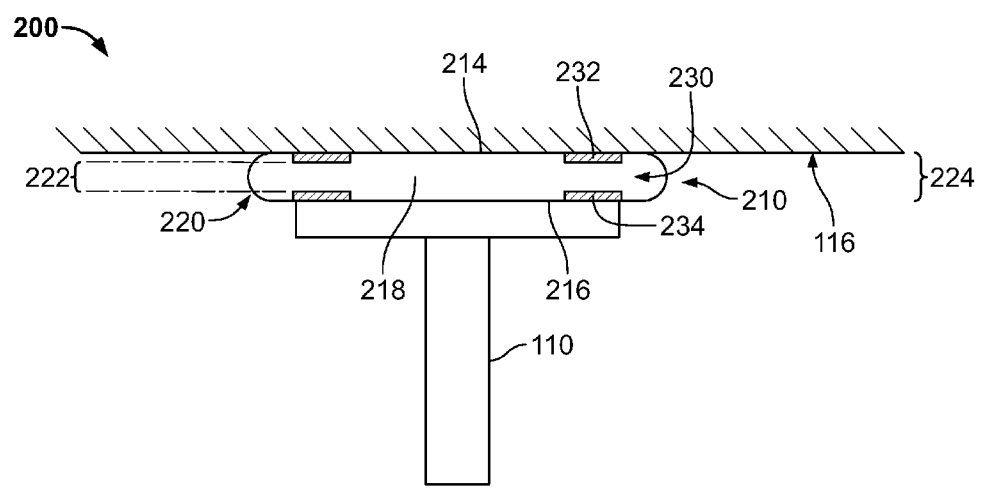
FIG. 4 is cross-sectional view of the shim measuring device shown in FIG. 3.

FIG. 3 is a top perspective view of an exemplary shim measuring device 200 that may be used with the shim measurement system 10 shown in FIG. 1. FIG. 4 is a cross-sectional view of the shim measuring device 200 shown in FIG. 3 and taken along the lines A-A.

The shim measuring device 200 includes a body, also referred to herein as a template 210, and a plurality of gap measurement sensors 212, such as capacitance sensors 212. In various embodiments, the template 210 includes a first side or portion 214 and an opposing second side or portion 216 that is coupled to the first portion 214 such that a substantially airtight void 218 is defined between the first and second portions 214 and 216. Accordingly, in various embodiments, the shim measuring device 200 is a portable expandable device, template, or bladder that is configured to be inserted between two parts such as for example, the engine strut 110 and the wing 116. More specifically, in operation the shim measuring device 200 is operable in a first mode of operation, also referred to herein as a deflated mode or a contracted mode, to enable the shim measuring device 200 to be inserted into a gap, such as the gap 220 defined between the engine strut 110 and the wing 116. Thus, in the deflated mode of operation, the shim measuring device 200 has a nominal thickness 222 that is less that a thickness 224 of the gap being measured, i.e. the gap 220 between the engine strut 110 and the wing 116.

The shim measuring device 200 is also operable in a second mode of operation, referred to herein as an inflated mode, or expanded mode, after the shim measuring device 200 is inserted into the gap 220. The inflated mode enables the shim measuring device 200 to be expanded until the first portion 214 contacts the wing 116 and the second portion 216 contacts the engine strut 110 to enable the measuring device 200 to measure a thickness of the gap 220.

In various embodiments, the first and second portions 214 and 216 are fabricated from a flexible or pliable material to enable the shim measuring device 200 to expand or contract as described above. In one embodiment, the first and second portions 214 and 216 are fabricated using a flexible printed circuit board which may also be referred to herein as a flex circuit. In some embodiments, the flexible printed circuit boards may be fabricated to include, for example, a flexible conductive substrate (not shown) which may include a plurality of signal traces formed thereon to enable information to be transmitted from the capacitance sensors 212 to the data acquisition system 30. The flexible printed circuit boards may also include a ground plane (not shown) that is separated by a dielectric material (not shown) that functions as an insulating interposer. In another embodiment, the first and second portions 214 and 216 are fabricated from a flexible polyester material, such as for example Mylar®.

The signal traces may be formed on the flexible substrate using, for example, an etching procedure. Optionally, the signal traces may be deposited on the flexible substrate. In various embodiments, the shim measuring device 200 may be fabricated to have a predetermined bending profile that is configured to substantially match a gap being measured. For example, the shim measuring device 200 may have a first bending profile to enable the shim measuring device 200 to measure a gap between a first and second part. Optionally, the shim measuring device 200 may have a different bending profile to measure a gap between a third and a fourth part. Moreover, a thickness of the shim measuring device 200, in either the expanded mode or the contracted mode, may be selected based by the size of the gap being measured. For example, the shim measuring device 200 may be configured to expand to a predetermined volume that enables the shim measuring device 200 to measure a gap between two predetermined parts. Additionally, a second different shim measuring device (not shown) may be configured to expand to a second predetermined volume that enables the second shim measuring device to measure a gap between two different predetermined parts.

In various embodiments, the shim measuring device 200 has a shape or profile 230 that is substantially the same as a profile of a mounting surface of at least one of the parts. More specifically, the template 210 may be fabricated to have a profile that substantially matches a size and a profile of, for example, a mounting pad 124 of the engine strut 110. For example, as shown in FIG. 2, the mounting pad 124 has a substantially rectangular profile. Accordingly, in the exemplary embodiment, the template 210 may have a substantially rectangular profile that is approximately the same size as the mounting pad 124. In use, fabricating the template 210 to have a size and profile that is substantially the same as the size and profile of the gap being measured enables the shim measuring device 200 to acquire all the gap measurements in a single iteration without moving the shim measuring device to different locations. However, it should be realized that in various embodiments, for relatively large gaps, the shim measuring device 200 may be repositioned to different locations within the gap.

As described above, the shim measuring device 200 includes the plurality of capacitance sensors 212. In the illustrated embodiment shown in FIG. 4, each capacitance sensor 212 includes a first capacitance sensor portion 232 that is mounted to the first portion 214 of the template 210. Each capacitance sensor 212 also includes a second capacitance sensor portion 234 that is mounted to the second portion 216 of the template 210. As shown in the embodiment illustrated in FIG. 4, the first capacitance sensor portion 232 is substantially aligned with the second capacitance sensor portion 234, across the void 218. Accordingly, in operation, a single capacitance sensor 212 is configured to measure a capacitance of the air between the first capacitance sensor portion 232 and second capacitance sensor portion 234. The capacitance of the air may then be utilized to generate a measurement value that indicates a width of the gap 220 at the location of the capacitance sensor 212. For example, assume that the capacitance sensor 212 is located at a position having coordinates of $x_1, y_1$. Thus, the output from the capacitance sensor 212 indicates a width of the gap 220 at the position $x_1, y_1$. It should be realized that as the void 218 is expanded the capacitance decreases and as the void 218 contracts the capacitance increases. Accordingly, the change in the size of the void 218, which is directly proportional to the width of the gap 220, may be utilized to measure the width of the gap 220.

In various embodiments, and as shown in FIG. 3, the shim measuring device 200 includes n capacitance sensors 212. Moreover, in various embodiments, each of the capacitance sensors 212 is located at a different coordinate position on the template 210. Accordingly, in the exemplary embodiment, the shim measuring device 200 is configured to output n gap measurements, wherein each gap measurement is acquired using a single capacitance sensors 212 and each of the capacitance sensors 212 is located at a different position on the template 210. In various embodiments, the capacitance sensors 212 may be installed proximate to an edge of the template 210. Optionally, additional capacitance sensors 240 may be located between the edge mounted capacitance sensors 212. The outputs from the capacitance sensors 212 are collected to form the file 22 shown in FIG. 1.

Figure 5:
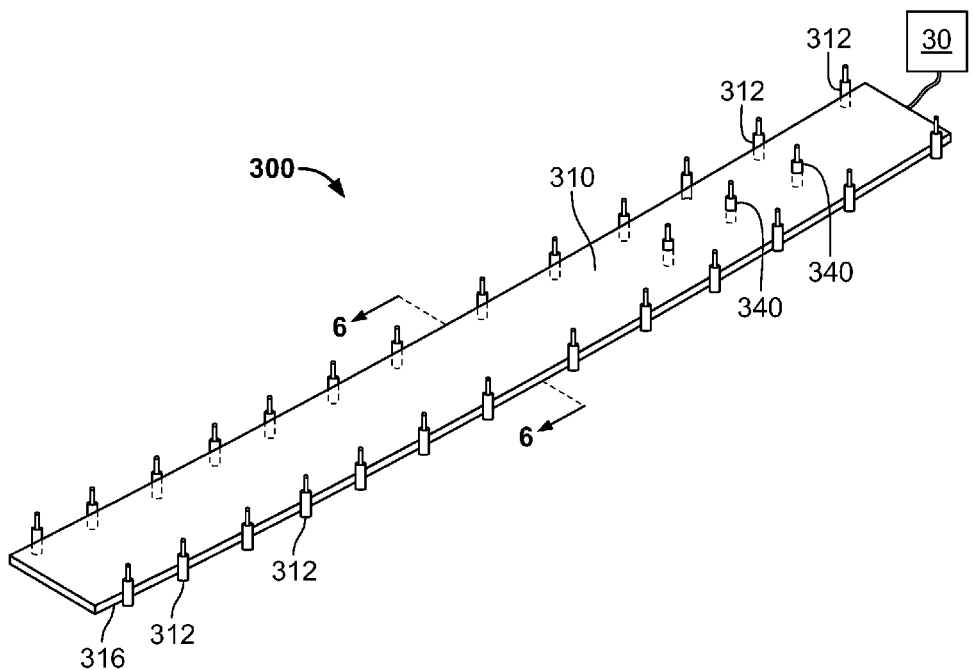
FIG. 5 is top perspective view of another shim measuring device that may be utilized with the shim measurement system shown in FIG. 1 in accordance with one embodiment.
Figure 6:
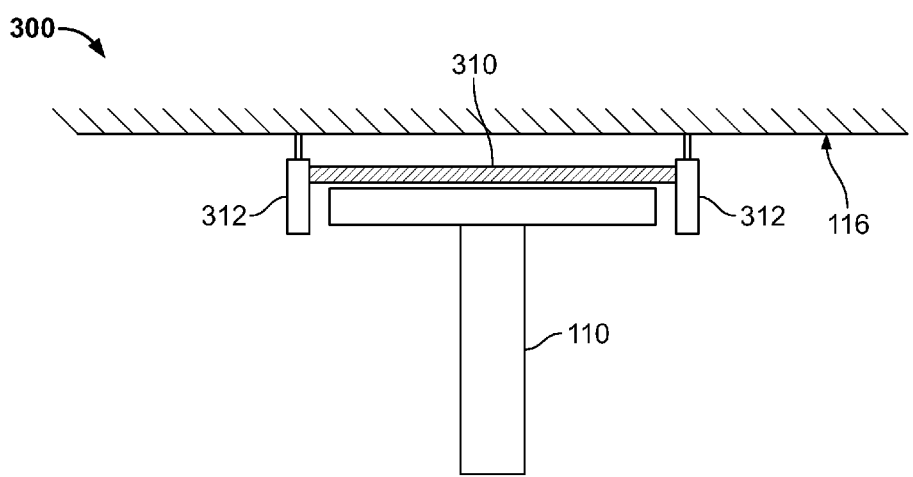
FIG. 6 is cross-sectional view of the shim measuring device shown in FIG. 5.

FIG. 5 is a top perspective view of another exemplary shim measuring device 300 that may be used with the shim measurement system 10 shown in FIG. 1. FIG. 6 is a cross-sectional view of the shim measuring device 300 shown in FIG. 5 and taken along the lines B-B.

The shim measuring device 300 includes a body, also referred to herein as a template 310, and a plurality of gap measurement sensors 312, which in one embodiment, are linear displacement sensors 312. In various embodiments, the template 310 is fabricated from a flexible or pliable material to enable the shim measuring device 300 to be inserted into the gap 220. In one embodiment, the template 310 is fabricated using a flexible printed circuit board which may also be referred to herein as a flex circuit similar to the template 210 described above. In another embodiment, the template 310 may be fabricated from a flexible polyester material, such as for example Mylar®.

In various embodiments, the shim measuring device 300 has a shape or profile 330 that is substantially the same as a profile of a mounting surface of at least one of the parts. More specifically, the template 310 may be fabricated to have a profile that substantially matches a size and a profile of, for example, a mounting pad 124 of the engine strut 110.

As described above, the shim measuring device 300 includes a plurality of linear displacement sensors 312. In various embodiments, each of the linear displacement sensors 312 may include a coil assembly (not shown), a core (not shown), and a spring (not shown). In operation, the linear displacement sensors 312 are configured to move along a single axis, i.e. parallel to the sensors and substantially normal to a surface of the template 310 The linear displacement sensor 312 therefore generates an output signal that is proportional to the movement of the core within the coil assembly. More specifically, and for example, the template 310 is initially positioned such that a lower surface 316 of the template is positioned against the engine strut 110. An electrical signal is then supplied to the linear displacements sensors 312 causing the cores within the linear displacement sensors 312 to be repositioned from a retracted position to an extended position wherein the core contacts the wing 116. The amount of displacement between an initial position wherein the core is retracted and a second position wherein the core is extended indicates the total displacement of the core. The value indicating the total displacement of the core may, which is directly related to the width of the gap 220, is then utilized to provide a measurement of the width of the gap 220.

Accordingly, in operation, a single linear displacement sensor 312 is configured to measure a width of the gap 220 at a single location within the gap 220. In various embodiments, and as shown in FIG. 5, the shim measuring device 300 includes n linear displacement sensors 312. Moreover, in various embodiments, each of the linear displacement sensors 312 is located at a different coordinate position on the template 310. Accordingly, in the exemplary embodiment, the shim measuring device 300 is configured to output n gap measurements, wherein each gap measurement is acquired using a single linear displacement sensor 312 and each of the linear displacement sensors 312 is located at a different position on the template 310. In various embodiments, the linear displacement sensors 312 may be installed proximate to an edge of the template 310 as shown in FIG. 5. Optionally, additional linear displacement sensors 340 may be located between the edge mounted linear displacement sensors 312. The outputs from the linear displacement sensors 312 are collected to form the file 22 shown in FIG. 1.

Figure 7:
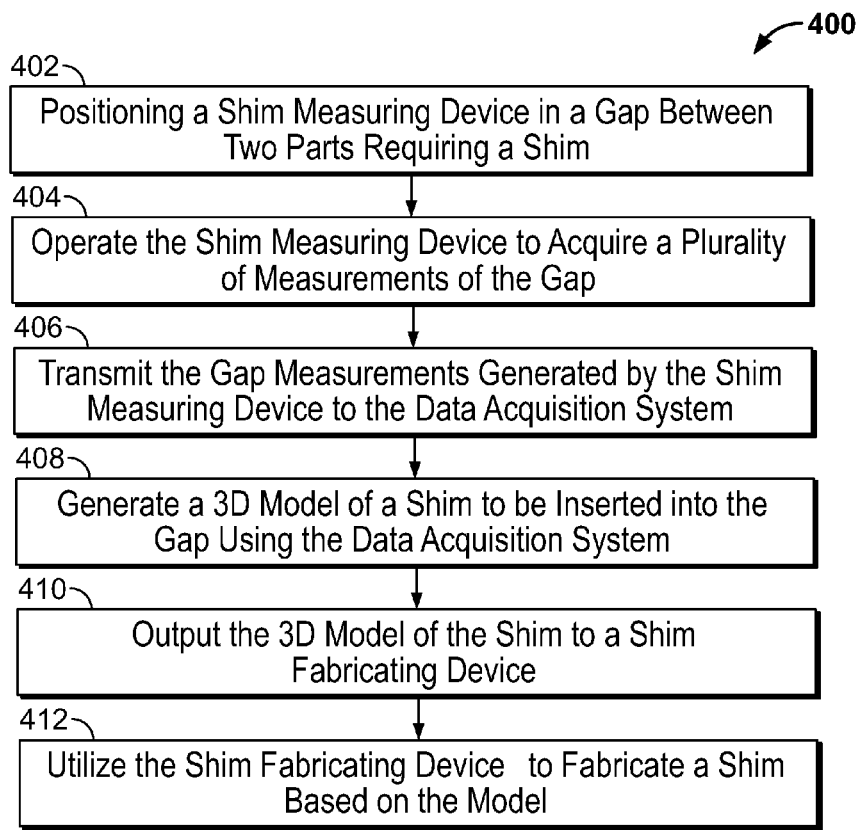
FIG. 7 is an illustration of operations performed by one embodiment to fabricate a shim.

FIG. 7 is a flowchart illustrating a method 400 of measuring a gap in which a shim is to be positioned in accordance with various embodiments. At 402, a shim measuring device, such as the shim measuring device 200 or the shim measuring device 300 is positioned in a gap between two parts requiring a shim. At 404, the shim measuring device is operated to acquire the plurality of measurements of the gap. For example, the shim measuring device 200 may be inflated. Optionally, an electrical signal may be provided to the shim measuring device 300. At 406, the gap measurements generated by the shim measuring device are transmitted to the DAS 30. At 408, the DAS 30 is configured to utilize the measurements received from the shim measuring device to generate a 3D model of a shim to be installed in the gap. In one embodiment, the 3D model is generated using the measurements acquired at 404. At 410, the 3D model of the shim is output to a shim fabricating device, such as the shim fabricating device 40 shown in FIG. 1. At 412, the shim fabricating device fabricates a shim, such as the shim 122 shown in FIG. 2 based on the 3D model.

Figure 8:
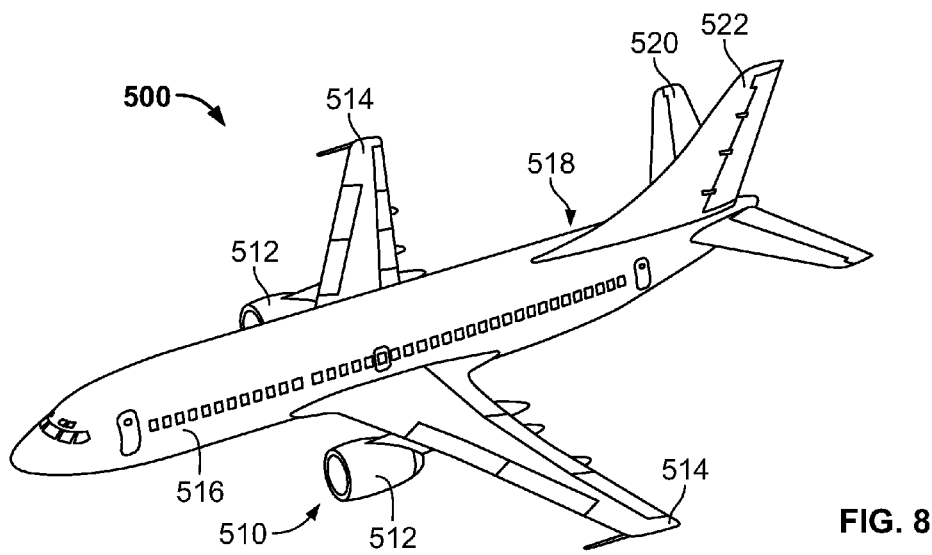
FIG. 8 is an illustration of an aircraft having a shim in accordance with one embodiment.

As described above, the shim measurement system 10 may be utilized to generate a model of a shim that may then be used to fabricate the shim. The shims fabricated based on the measurements provided by the shim measurement system 10 may be utilized to shim various parts of an aircraft. For example, FIG. 8 illustrates an aircraft 500 that may include shims that are manufactured using the measurements and or 3D model generated by the shim measurement system 10 described above. The aircraft 500 includes a propulsion system 510 that includes two turbofan engines 512. The engines 512 are carried by the wings 514 of the aircraft 500. In other embodiments, the engines 512 may be carried by the fuselage 516 and/or the empennage 518. The empennage 518 can also support horizontal stabilizers 520 and a vertical stabilizer 522.

It should be noted that the various embodiments or portions thereof, such as the shim measurement system 10 may be implemented in hardware, software or a combination thereof. The various embodiments and/or components, for example, the DAS 30 also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid state drive, optical disk drive, and the like. The storage device may also be other similar means for loading computer programs or other instructions into the computer or processor.

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from the scope thereof. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

What is claimed is:

1. A shim measurement system comprising:
a shim measuring device configured to be positioned between a first part and a second part, the shim measuring device including a template and a plurality of gap measurement sensors coupled to the template, each of the gap measurement sensors configured to measure a distance between the first and second parts, the shim measuring device configured to output a matrix of values that represent the plurality of measured distances; and
a computer configured to receive the matrix of values and generate a model of a shim based on the matrix of values.

2. The shim measurement system of claim 1, wherein the template comprises an expandable template, the template having a first volume when the template is deflated and a second different volume when the template is inflated.

3. The shim measurement system of claim 1, wherein the template includes a first portion and an opposing second portion coupled to the first portion, the gap measurement sensors comprising a plurality of capacitance measuring sensors configured to measure a capacitance between the first and second portions.

4. The shim measurement system of claim 1, wherein the template includes a first flexible printed circuit board and a second flexible printed circuit board coupled to the first flexible printed circuit board, the gap measurement sensors comprising a plurality of capacitance sensors mounted to the first and second flexible printed circuit boards and configured to measure a capacitance between the first and second flexible printed circuit boards.

5. The shim measurement system of claim 1, wherein the template includes a first portion and a second portion coupled to the first portion, the first and second portions fabricated from a flexible polyester material.

6. The shim measurement system of claim 1, wherein the gap measurement sensors each comprise a first capacitance sensor portion coupled to a first side of the template and a second capacitance sensor portion coupled to an opposite second side of the template.

7. The shim measurement system of claim 1, wherein the gap measurement sensors comprise a plurality of linear displacement sensors.

8. The shim measurement system of claim 1, wherein the template has a profile that is substantially the same as a profile of a mounting surface of at least one of the first part and second parts.

9. A shim measuring device comprising:
a flexible template configured to be positioned between a first part and a second part; and
a plurality of gap measurement sensors coupled to the flexible template, each of the gap measurement sensors configured to measure a distance between the first and second parts, the shim measuring device configured to output a matrix of values to generate a model of a shim.

10. The shim measuring device of claim 9, wherein the template comprises an expandable template, the template having a first volume when the template is deflated and a second different volume when the template is inflated.

11. The shim measuring device of claim 9, wherein the template includes a first portion and an opposing second portion coupled to the first portion, the gap measurement sensors comprising a plurality of capacitance measuring sensors configured to measure a capacitance between the first and second portions.

12. The shim measuring device of claim 9, wherein the template includes a first flexible printed circuit board and a second flexible printed circuit board coupled to the first flexible printed circuit board, the gap measurement sensors comprising a plurality of capacitance sensors mounted to the first and second flexible printed circuit boards and configured to measure a capacitance between the first and second flexible printed circuit boards.

13. The shim measuring device of claim 9, wherein the template includes a first portion and a second portion coupled to the first portion, the first and second portions fabricated from a flexible polyester material.

14. The shim measuring device of claim 9, wherein the gap measurement sensors each comprise a first capacitance sensor portion coupled to a first side of the template and a second capacitance sensor portion coupled to an opposite second side of the template.

15. The shim measuring device of claim 9, wherein the gap measurement sensors comprise a plurality of linear displacement sensors.

16. The shim measuring device of claim 9, wherein the template has a profile that is substantially the same as a profile of a mounting surface of at least one of the first part and second parts.

17. A method of fabricating a shim, said method comprising:
inserting a shim measurement device between a first part and a second part, the shim measuring device including a flexible template and a plurality of gap measurement sensors coupled to the flexible template;
generating a plurality of gap measurements using the gap measurement sensors; and
generating a three-dimensional (3D) model of a shim to be positioned between the first and second parts using the plurality of gap measurements.

18. The method of claim 17, wherein the template comprises an expandable template, said method further comprising inflating the template to generate the plurality of gap measurements.

19. The method of claim 17, wherein generating a plurality of gap measurements comprises generating a plurality of gap measurements using at least one of a plurality of capacitance measuring sensors and a plurality of linear displacement sensors.

20. The method of claim 17 further comprising fabricating a shim using the 3D model.

* * * * *